Feb. 10, 1953     LE CONIE STILES     2,627,825
PRODUCTION OF LAYER PASTRY

Filed Nov. 25, 1946                       2 SHEETS—SHEET 1

INVENTOR:
Le Conie Stiles
ATTORNEY.

Feb. 10, 1953     LE CONIE STILES     2,627,825
PRODUCTION OF LAYER PASTRY
Filed Nov. 25, 1946                                2 SHEETS—SHEET 2
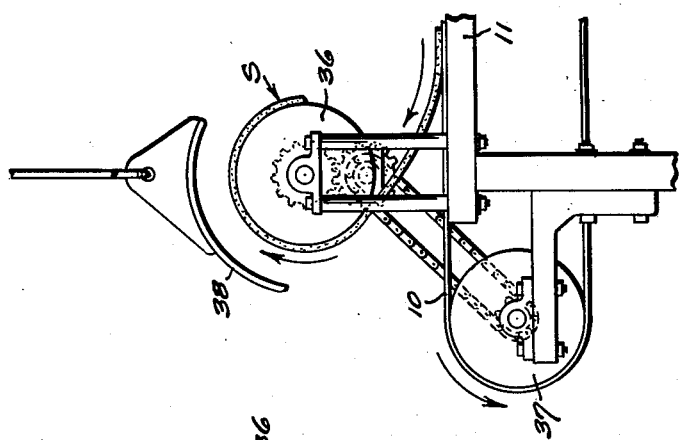
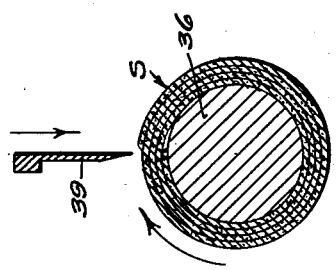
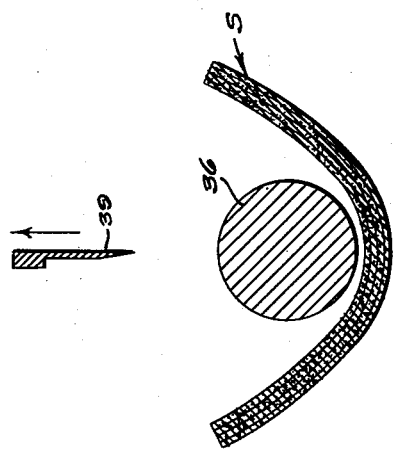

Patented Feb. 10, 1953

2,627,825

UNITED STATES PATENT OFFICE 2,627,825

PRODUCTION OF LAYER PASTRY

Le Conie Stiles, Seattle, Wash.

Application November 25, 1946, Serial No. 712,138

4 Claims. (Cl. 107—54)

This invention relates to the bakery art, and for its general object aims to provide a machine and method for producing layer pastry.

Other and more particular objects and advantages will appear in the course of the following description and claims. The invention consists in the new method of producing layer pastry from an elongated sheet of rolled dough and in the novel construction and in the adaptation and combination of parts of a machine for practicing said method, as hereinafter described and claimed.

In the accompanying drawings:

Figure 1 is a fragmentary side elevational view portraying a machine produced in accordance with the preferred embodiment of the present invention, and showing a sheet of dough in the course of being processed through two steps of the method, first a buttering step accomplished by passing the dough sheet below a butter applicator and second a wrapping step accomplished by feeding the leading end of the dough body onto the revolving surface of a roll-in roller.

Fig. 4 is a fragmentary side elevational view of the tail end of the machine, particularly to detail the roll-in roller, and employing an enlarged scale corresponding to that of Figs. 2 and 3.

Fig. 5 is a longitudinal vertical sectional view of the roll-in roller and representing the dough body after being completely wrapped thereon and preliminary to being cut by a knife which is mounted above and longitudinal to the axis of the roller and arranged for vertical reciprocatory movement into and from a cutting position.

Figure 1:
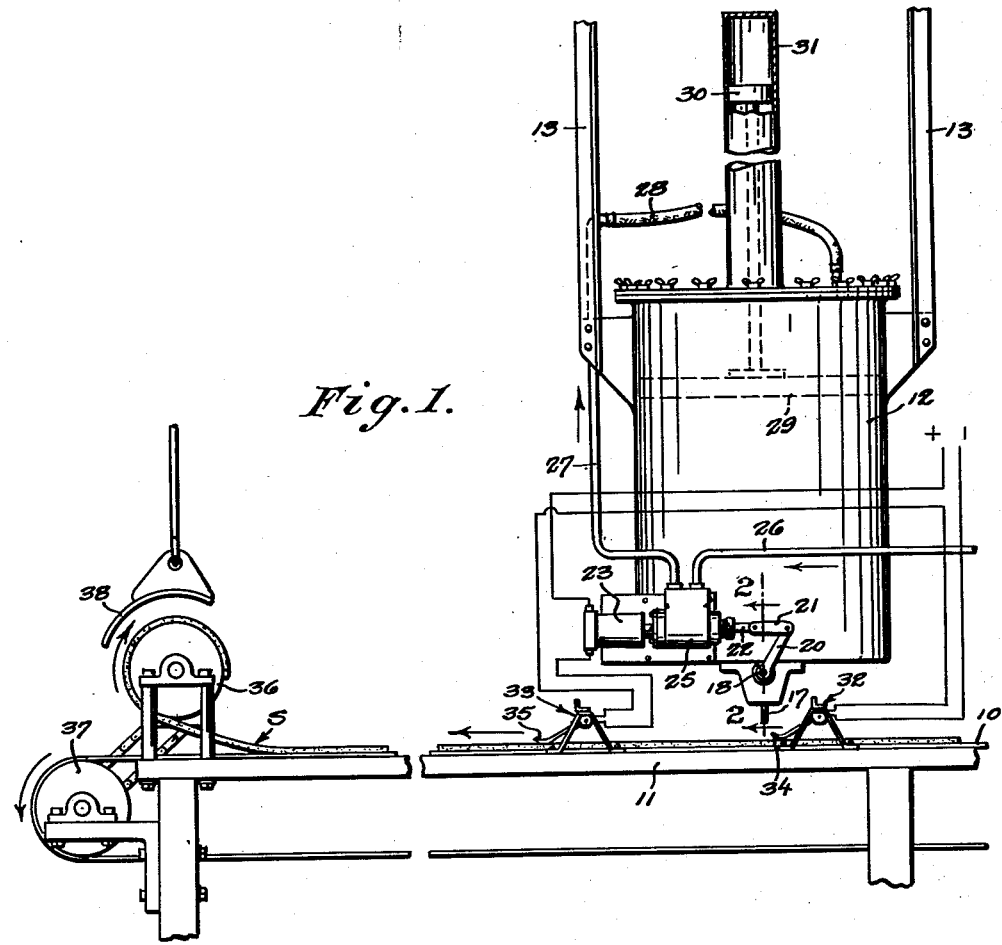
Figure 2:
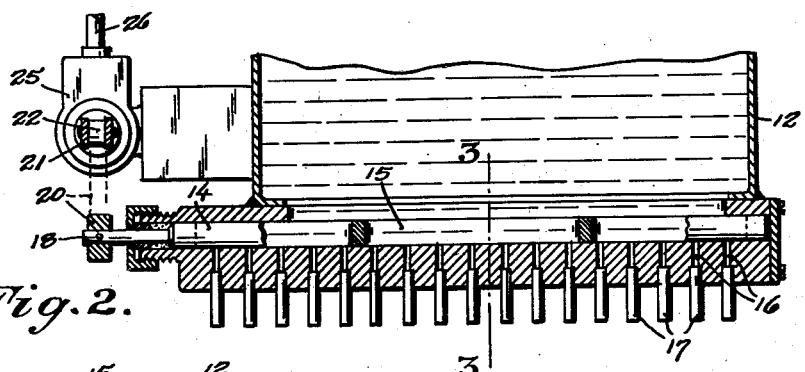
Fig. 2 is a detail fragmentary longitudinal vertical section taken to an enlarged scale on line 2—2 of Fig. 1.
Figure 3:
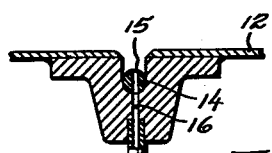
Fig. 3 is a fragmentary transverse vertical section on line 3—3 of Fig. 2.

Fig. 6 is a view similar to Fig. 5 excepting that the knife is here shown as having performed its cutting action to accomplish a slitting of the wrapped dough body and allow the latter to fall away from opposite sides of the roller; and Fig. 7 is a longitudinal vertical section of the multi-layer dough body after the latter is dropped from the roller into a subjacent pan ready for introduction to a baking oven.

The machine of the present invention employs an endless conveyor belt denoted by the numeral 10 and onto the upper run of which the dough body, designated S, is delivered in sheet form from a sheeting mechanism. While not shown, the sheeter is ordinarily comprised of two pressure-applying rollers driven in opposite directions of rotation and between which the dough body is fed. To hold the upper run of the belt on a fixed level, the same is sustained upon a table which extends transversely between the side girders 11 of a supporting framework.

In moving with the belt, the dough sheet is caused to travel below a cylindrical tank 12 suspended by hangers 13 to occupy an elevated position above the belt, and contained in this tank is a fluid preparation hereinafter termed "butter." The tank is fitted at the bottom with a rotary valve 14, diametrically slotted as at 15, and opened and closed by rotation of this valve are a multiplicity of closely spaced discharge ducts 16 collectively spanning the width of the belt. These ducts are each fitted with a discharge nozzle 17, the nozzles being removable at will for replacement by plug stoppers (not shown). The valve projects by a stem 18 through a suitable stuffing box and there is pinned to the exposed end of the stem a crank arm 20 which attaches by its free extremity with a link 21 which connects in turn with an axially movable rod 22. A solenoid unit 23 controls the movement of the rod and coincidentally governs the working of a sliding valve received in the chest of a valve body 25. Connecting by suitable ports with the valve chest are two pressure-air lines, one of which, denoted 26, leads from a pressure source of air supply and the other, designated 27, connects through an intervening hose 28 with the head end of the tank. There is received in the tank, and made subject to the pressure delivered through line 27, a plunger 29 acting as a ram-follower for the butter preparation. The plunger has a close-fitted engagement with the walls of the tank and is guidably supported by a piston 30 working in a vented pipe 31 surmounting the head wall of the tank. While not shown, the tank is provided with a suitable pressure-released cock.

To activate the solenoid against the yielding resistance of a return spring (not shown), the solenoid is introduced in a normally open electric circuit closed by two switches 32 and 33 which are wired in series, and these switches are operated by elevational movement of pivoted arms 34 and 35 disposed in the path of travel of the dough sheet one immediately in advance of the transverse vertical plane in which the butter is ejected and the other in following relation to said plane removed therefrom a distance approximating the circumference of a roll-in roller to be hereinafter described. Such circumference determines the length of the multi-layer pastry which my machine is designed to produce and the roller which I employ will hence be selected with the pastry in mind.

The working of the sliding valve within the chest of the valve body is such that an energizing of the solenoid pulls the valve forwardly and brings the two ports, one for pipe 26 and the other for pipe 27, into communication to subject the plunger 29 to the pressure of the air source, and concurrent with this action the crank is drawn forwardly to turn the rotary valve 14 and responsively open the discharge ducts to permit a flow of butter from the tank. Upon a de-energizing of the solenoid, the associated spring returns the several parts to their inactive positions.

The roll-in roller, denoted 36, occupies a position of the tail end of the belt spaced above the latter and is of a live nature driven about an axis paralleling that of the belt's tail roller 37. Deriving its powering energy either from the tail roller or as may be otherwise desired, the roll-in roller is driven in a manner such as to run counter to the rotation of the belt's roller and at a rim speed approximating the traveling speed of the belt. Above the roll-in roller there is suspended a hood 38 capable of being swung into and out of an operating position, and above this hood and arranged, when the hood is removed, to be reciprocally operated in a vertical direction into and out of contacting engagement with the surface of the roll-in roller is a knife 39. The blade of the knife extends longitudinal to the axis of the roll-in roller and has a length corresponding to the length of the roller. The roll-in roller is composed of Neoprene or a relatively soft rubber to allow the knife to slightly compress the roller as it accomplishes its cutting function and thus protect the roller against being cut.

In practicing the present method, the sheeted dough body is fed onto the head end of the belt and thence travels with the latter to first raise the arm 34 of the first switch 32. The electric circuit remains open, however, until the progressive advance of the dough sheet has brought the lead end into engagement with the arm 35 of the second switch 33 whereupon the solenoid becomes energized to effectuate a pressure discharge of the multiple streams of butter. Such butter feed will, perforce, continue until the trailing end of the dough body advances beyond the control arm of the first switch and the electric circuit thereupon opens. The responsive de-energizing of the solenoid allows the spring to assert itself and cause the two pressure-air lines to become isolated one from the other while simultaneously closing the tank's rotary discharge valve. In the meantime, the leading end of the dough body will have progressed to a point whereat the same lies below the roll-in roller and the operator thereupon raises the end of the dough sheet to bring the same under and over the roll-in roller in the manner illustrated in Fig. 4. Such leading end is devoid of butter and thus, in addition to saving butter which would be otherwise largely lost by transfer to the surface of the roller, the dough sheet is given a friction grip from the roller and wraps itself about the latter as the same turns, ultimately developing a multiple wrap. After the trailing end of the dough sheet reaches the roller and is wrapped thereupon, the machine is stopped and the hood, which acts to hold the trailing end down and prevent flapping, is swung out of the way of the knife and the latter is brought down in the manner illustrated in Fig. 5. A pan 40, placed below the roll-in roller, catches the multi-layer product as the two free wings of the latter fall away from opposite sides of the roller. It will be understood that butter is discharged from only as many of the discharge ducts 16 as are required to span the particular width of dough sheet which is being run, the ducts which lie beyond this limit being closed by the plug stoppers. Should it be desired, the operation of cutting the rolled body of dough, receiving the layer product in a pan, and conveying successive pans to the baking oven could quite feasibly be made automatic, and a machine modified to the accomplishment of this end would require little ingenuity to devise. It is, of course, not essential that the roll-in roller be stopped during the cutting step, nor is it necessary that the knife work from a position exteriorly of the roller. The knife could be housed within the roll-in roller, and the latter slotted to accommodate an outwardly rather than an inwardly directed radial cutting motion.

The invention should be clear from the foregoing description taken with the illustration of my now-preferred embodiment of a machine which I prefer to employ in performing my process. No limitations are to be implied as the invention quite obviously partakes of numerous changes without departing from the spirit of the invention.

What I claim is:

1. The method of producing layer pastry from an elongated dough sheet which comprises giving travel to the dough sheet along a predetermined path and, in course of travel, buttering the surface of the sheet, causing the buttered sheet to wind itself in successive wraps about a revolving mandrel, freeing the body of dough from the mandrel by stopping the rotation of the latter and cutting through the multiple wraps on a line approximately radial to the axis of the mandrel, and baking the layer product which results.

2. The method of producing layer pastry which comprises the steps of causing an elongated dough sheet to wind itself in successive wraps about the surface of a revolving mandrel, freeing the body of dough from the mandrel by stopping the rotation of the latter and cutting through the multiple wraps on a line approximately radial to the axis of the mandrel, and baking the layer product which results.

3. The method of claim 1 in which all but a leading transverse band portion of the dough sheet having a fore-and-aft dimension approximating the circumference of the mandrel is buttered in order that the sheet's leading end may take a frictional grip upon the mandrel in its initial turn about the latter.

4. A machine for making layer pastry from an elongated dough sheet comprising, in combination: a live mandrel journaled for rotation about a horizontal axis, a conveyor leading to said mandrel and arranged to give progressive travel to the dough sheet for conveying the sheet to the mandrel so as to permit a turn of the sheet to be taken about the mandrel and thus, by rotation of the mandrel, cause the following body of the sheet to wind itself in successive wraps about the roller, and means for cutting through the several wraps on a plane approximately radial to the rotary axis of the mandrel, said cutting action permitting the resulting free ends of the multiple-layer dough body to be peeled back away from the mandrel.

LE CONIE STILES.

REFERENCES CITED

The following references are of record in the file of this patent:

UNITED STATES PATENTS

| Number | Name | Date |
|---|---|---|
| 1,838,011 | St. Peter | Dec. 22, 1931 |
| 1,851,945 | Kremmling | Mar. 29, 1932 |
| 1,905,899 | Campbell | Apr. 25, 1933 |
| 1,961,966 | Gerola | June 5, 1934 |
| 2,182,068 | Clark | Dec. 5, 1939 |
| 2,217,896 | Fonken | Oct. 15, 1940 |
| 2,255,282 | Duffy et al. | Sept. 9, 1941 |
| 2,354,681 | Grimm et al. | Aug. 1, 1944 |
| 2,365,349 | Mac Manus | Dec. 19, 1944 |
| 2,437,202 | Marino | Mar. 2, 1948 |